(12) United States Patent
Lomas et al.

(10) Patent No.: US 8,734,111 B2
(45) Date of Patent: May 27, 2014

(54) PLATFORM COOLING PASSAGES AND METHODS FOR CREATING PLATFORM COOLING PASSAGES IN TURBINE ROTOR BLADES

(75) Inventors: Jonathan Matthew Lomas, Simpsonville, SC (US); Mark Lawrence Hunt, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 504 days.

(21) Appl. No.: 13/169,142

(22) Filed: Jun. 27, 2011

(65) Prior Publication Data

US 2012/0328451 A1    Dec. 27, 2012

(51) Int. Cl.
*F01D 5/14* (2006.01)

(52) U.S. Cl.
USPC ............... 416/193 A; 416/97 R; 416/96 R

(58) Field of Classification Search
CPC ...... F01D 5/187; F01D 5/14; F05B 2240/801
USPC ..................... 416/97 R, 193 A; 29/889.7
See application file for complete search history.

(56) References Cited

U.S. PATENT DOCUMENTS

| | | | |
|---|---|---|---|
| 3,950,114 A | 4/1976 | Helms | |
| 4,712,979 A | 12/1987 | Finger | |
| 4,798,514 A | 1/1989 | Pask | |
| 5,340,278 A | 8/1994 | Magowan | |
| 5,382,135 A | 1/1995 | Green | |
| 5,513,955 A * | 5/1996 | Barcza | 416/95 |
| 5,813,835 A | 9/1998 | Corsmeier et al. | |
| 6,017,189 A * | 1/2000 | Judet et al. | 416/97 R |
| 6,017,819 A | 1/2000 | Brigham et al. | |
| 6,019,579 A | 2/2000 | Fukuno et al. | |
| 6,120,249 A | 9/2000 | Hultgren et al. | |
| 6,190,130 B1 | 2/2001 | Fukue et al. | |
| 6,196,799 B1 | 3/2001 | Fukue et al. | |
| 6,402,417 B1 | 6/2002 | Okamoto | |
| 6,431,833 B2 | 8/2002 | Jones | |
| 6,457,935 B1 * | 10/2002 | Antunes et al. | 415/115 |
| 6,478,540 B2 | 11/2002 | Abuaf et al. | |
| 7,097,424 B2 | 8/2006 | Cunha et al. | |
| 7,147,439 B2 | 12/2006 | Jacala et al. | |
| 7,198,467 B2 | 4/2007 | Keith et al. | |

(Continued)

FOREIGN PATENT DOCUMENTS

EP         1905950 A1    4/2008

OTHER PUBLICATIONS

Search Report and Written Opinion from EP Application No. 12173066.7 dated Aug. 30, 2012.

*Primary Examiner* — Ninh H Nguyen
(74) *Attorney, Agent, or Firm* — Mark E. Henderson; Ernest G. Cusick; Frank A. Landgraff

(57) ABSTRACT

A method for creating a platform cooling passage in a turbine rotor blade, wherein the turbine rotor blade comprises a platform at an interface between an airfoil and a root, wherein the platform includes a platform topside along an outboard surface. The method may include the steps of forming a recessed area along the platform topside; forming a coverplate; and affixing the coverplate to the platform topside. The coverplate may be configured to correspond to the shape of the recessed area such that, when affixed to the platform topside in a desired manner, the coverplate substantially encloses the recessed area to form the platform cooling passage therein.

24 Claims, 12 Drawing Sheets

(56) References Cited

U.S. PATENT DOCUMENTS

| | | |
|---|---|---|
| 7,347,664 B2 | 3/2008 | Kayser et al. |
| 7,416,391 B2 | 8/2008 | Veltre et al. |
| 8,251,665 B2 * | 8/2012 | Baldauf et al. ............ 416/193 A |
| 2006/0056968 A1 | 3/2006 | Jacala et al. |
| 2007/0189896 A1 | 8/2007 | Itzel et al. |

* cited by examiner

PLATFORM COOLING PASSAGES AND METHODS FOR CREATING PLATFORM COOLING PASSAGES IN TURBINE ROTOR BLADES

BACKGROUND OF THE INVENTION

The present application relates generally to combustion turbine engines, which, as used herein and unless specifically stated otherwise, includes all types of combustion turbine engines, such as those used in power generation and aircraft engines. More specifically, but not by way of limitation, the present application relates to apparatus, systems and/or methods for cooling the platform region of turbine rotor blades.

A gas turbine engine typically includes a compressor, a combustor, and a turbine. The compressor and turbine generally include rows of airfoils or blades that are axially stacked in stages. Each stage typically includes a row of circumferentially spaced stator blades, which are fixed, and a set of circumferentially spaced rotor blades, which rotate about a central axis or shaft. In operation, the rotor blades in the compressor are rotated about the shaft to compress a flow of air. The compressed air is then used within the combustor to combust a supply of fuel. The resulting flow of hot gases from the combustion process is expanded through the turbine, which causes the rotor blades to rotate the shaft to which they are attached. In this manner, energy contained in the fuel is converted into the mechanical energy of the rotating shaft, which then, for example, may be used to rotate the coils of a generator to generate electricity.

Referring to FIGS. 1 and 2, turbine rotor blades 100 generally include an airfoil portion or airfoil 102 and a root portion or root 104. The airfoil 102 may be described as having a convex suction face 105 and a concave pressure face 106. The airfoil 102 further may be described as having a leading edge 107, which is the forward edge, and a trailing edge 108, which is the aft edge. The root 104 may be described as having structure (which, as shown, typically includes a dovetail 109) for affixing the blade 100 to the rotor shaft, a platform 110 from which the airfoil 102 extends, and a shank 112, which includes the structure between the dovetail 109 and the platform 110.

As illustrated, the platform 110 may be substantially planar. More specifically, the platform 110 may have a planar topside 113, which, as shown in FIG. 1, may include an axially and circumferentially extending flat surface. As shown in FIG. 2, the platform 110 may have a planar underside 114, which may also include an axially and circumferentially extending flat surface. The topside 113 and the bottom side 114 of the platform 110 may be formed such that each is substantially parallel to the other. As depicted, it will be appreciated that the platform 110 typically has a thin radial profile, i.e., there is a relatively short radial distance between the topside 113 and the bottom side 114 of the platform 110.

In general, the platform 110 is employed on turbine rotor blades 100 to form the inner flow path boundary of the hot gas path section of the gas turbine. The platform 110 further provides structural support for the airfoil 102. In operation, the rotational velocity of the turbine induces mechanical loading that creates highly stressed regions along the platform 110 that, when coupled with high temperatures, ultimately cause the formation of operational defects, such as oxidation, creep, low-cycle fatigue cracking, and others. These defects, of course, negatively impact the useful life of the rotor blade 100. It will be appreciated that these harsh operating conditions, i.e., exposure to extreme temperatures of the hot gas path and mechanical loading associated with the rotating blades, create considerable challenges in designing durable, long-lasting rotor blade platforms 110 that both perform well and are cost-effective to manufacture.

One common solution to make the platform region 110 more durable is to cool it with a flow of compressed air or other coolant during operation, and a variety of these type of platform designs are known. However, as one of ordinary skill in the art will appreciate, the platform region 110 presents certain design challenges that make it difficult to cool in this manner. In significant part, this is due to the awkward geometry of this region, in that, as described, the platform 110 is a periphery component that resides away from the central core of the rotor blade and typically is designed to have a structurally sound, but thin radial thickness.

To circulate coolant, rotor blades 100 typically include one or more hollow interior cooling passages 116 (see FIGS. 3, 4, 5, and 9) that, at minimum, extend radially through the core of the blade 100, including through the root 104 and the airfoil 102. As described in more detail below, to increase the exchange of heat, such interior cooling passages 116 may be formed having a serpentine path that winds through the central regions of the blade 100, though other configurations are possible. In operation, a coolant may enter the central interior cooling passages via one or more inlets 117 formed in the inboard portion of the root 104. The coolant may circulate through the blade 100 and exit through outlets (not shown) formed on the airfoil and/or via one or more outlets (not shown) formed in the root 104. The coolant may be pressurized, and, for example, may include pressurized air, pressurized air mixed with water, steam, and the like. In many cases, the coolant is compressed air that is diverted from the compressor of the engine, though other sources are possible. As discussed in more detail below, these interior cooling passages typically include a high-pressure coolant region and a low-pressure coolant region. The high-pressure coolant region typically corresponds to an upstream portion of the interior cooling passage that has a higher coolant pressure, whereas the low-pressure coolant region corresponds to a downstream portion having a relatively lower coolant pressure.

In some cases, the coolant may be directed from the interior cooling passages 116 into a cavity 119 formed between the shanks 112 and platforms 110 of adjacent rotor blades 100. From there, the coolant may be used to cool the platform region 110 of the blade, a conventional design of which is presented in FIG. 3. This type of design typically extracts air from one of the interior cooling passages 116 and uses the air to pressurize the cavity 119 formed between the shanks 112/platforms 110. Once pressurized, this cavity 119 then supplies coolant to cooling channels that extend through the platforms 110. After traversing the platform 110, the cooling air may exit the cavity through film cooling holes formed in the topside 113 of the platform 110.

It will be appreciated, however, that this type of conventional design has several disadvantages. First, the cooling circuit is not self-contained in one part, as the cooling circuit is only formed after two neighboring rotor blades 100 are assembled. This adds a great degree of difficulty and complexity to installation and pre-installation flow testing. A second disadvantage is that the integrity of the cavity 119 formed between adjacent rotor blades 100 is dependent on how well the perimeter of the cavity 119 is sealed. Inadequate sealing may result in inadequate platform cooling and/or wasted cooling air. A third disadvantage is the inherent risk that hot gas path gases may be ingested into the cavity 119 or the platform itself 110. This may occur if the cavity 119 is not maintained at a sufficiently high pressure during operation. If the pressure of the cavity 119 falls below the pressure within the hot gas path, hot gases will be ingested into the shank cavity 119 or the platform 110 itself, which typically damages these components as they were not designed to endure exposure to the hot gas-path conditions.

FIGS. 4 and 5 illustrate another type of conventional design for platform cooling. In this case, the cooling circuit is contained within the rotor blade 100 and does not involve the shank cavity 119, as depicted. Cooling air is extracted from one of the interior cooling passages 116 that extend through the core of the blade 110 and directed aft through cooling channels 120 formed within the platform 110 (i.e., "platform cooling channels 120"). As shown by the several arrows, the cooling air flows through the platform cooling channels 120 and exits through outlets in the aft edge 121 of the platform 110 or from outlets disposed along the suction side edge 122. (Note that in describing or referring to the edges or faces of the rectangular platform 110, each may be delineated based upon its location in relation to the suction face 105 and pressure face 106 of the airfoil 102 and/or the forward and aft directions of the engine once the blade 100 is installed. As such, as one of ordinary skill in the art will appreciate, the platform may include an aft edge 121, a suction side edge 122, a forward edge 124, and a pressure side edge 126, as indicated in FIGS. 3 and 4. In addition, the suction side edge 122 and the pressure side edge 126 also are commonly referred to as "slashfaces" and the narrow cavity formed therebetween once neighboring rotor blades 100 are installed may be referred to as a "slashface cavity".)

It will be appreciated that the conventional designs of FIGS. 4 and 5 have an advantage over the design of FIG. 3 in that they are not affected by variations in assembly or installation conditions. However, conventional designs of this nature have several limitations or drawbacks. First, as illustrated, only a single circuit is provided on each side of the airfoil 102 and, thus, there is the disadvantage of having limited control of the amount of cooling air used at different locations in the platform 110. Second, conventional designs of this type have a coverage area that is generally limited. While the serpentine path of FIG. 5 is an improvement in terms of coverage over FIG. 4, there are still dead areas within the platform 110 that remain uncooled. Third, to obtain better coverage with intricately formed platform cooling channels 120, manufacturing costs increase dramatically, particularly if the cooling channels having shapes that require a casting process to form. Fourth, these conventional designs typically dump coolant into the hot gas path after usage and before the coolant is completely exhausted, which negatively affects the efficiency of the engine. Fifth, conventional designs of this nature generally have little flexibility. That is, the channels 120 are formed as an integral part of the platform 110 and provide little or no opportunity to change their function or configuration as operating conditions vary. In addition, these types of conventional designs are difficult to repair or refurbish.

As a result, conventional platform cooling designs are lacking in one or more important areas. There remains a need for improved apparatus, systems, and methods that effectively and efficiently cool the platform region of turbine rotor blades, while also being cost-effective to construct, flexible in application, and durable.

BRIEF DESCRIPTION OF THE INVENTION

The present application thus describes a method for creating a platform cooling passage in a turbine rotor blade, wherein the turbine rotor blade comprises a platform at an interface between an airfoil and a root, wherein the platform includes a platform topside along an outboard surface. The method may include the steps of forming a recessed area along the platform topside; forming a coverplate; and affixing the coverplate to the platform topside. The coverplate may be configured to correspond to the shape of the recessed area such that, when affixed to the platform topside in a desired manner, the coverplate substantially encloses the recessed area to form the platform cooling passage therein.

The present invention further describes a platform cooling passage in a turbine rotor blade having a platform at an interface between an airfoil and a root. The platform may include a platform topside along an outboard surface. The platform cooling passage may include: a channel formed through the platform topside; and a coverplate, which comprises a non-integral component to the platform that is affixed to the platform topside. The channel may include an inlet, through which, in operation, coolant enters the platform cooling passage, and an outlet through which, in operation, coolant exits the platform cooling passage. The channel may include fluid directing structure. The fluid directing structure may be an integral component to the platform. The coverplate may be configured to correspond to the shape of the channel such that, when affixed in a desired manner, the coverplate substantially encloses the channel to form the platform cooling passage.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which.

DETAILED DESCRIPTION OF THE INVENTION

In general, the various designs of conventional internal interior cooling passages are effective at providing active cooling to certain regions within the rotor blade. However, as one of ordinary skill in the art will appreciate, the platform region is an area that is challenging to cool in this manner. This is due, at least in part, to the platform's awkward geometry—i.e., its narrow radial height and the manner in which it juts away from the core or main body of the rotor blade. Nevertheless, given its exposures to the extreme temperatures of hot gas path and high mechanical loading, the cooling requirements of the platform are considerable. As described above, conventional platform cooling designs are ineffective because they fail to address the particular cooling needs of the region, are inefficient with their usage of coolant, and/or are costly to fabricate.

Figure 1:
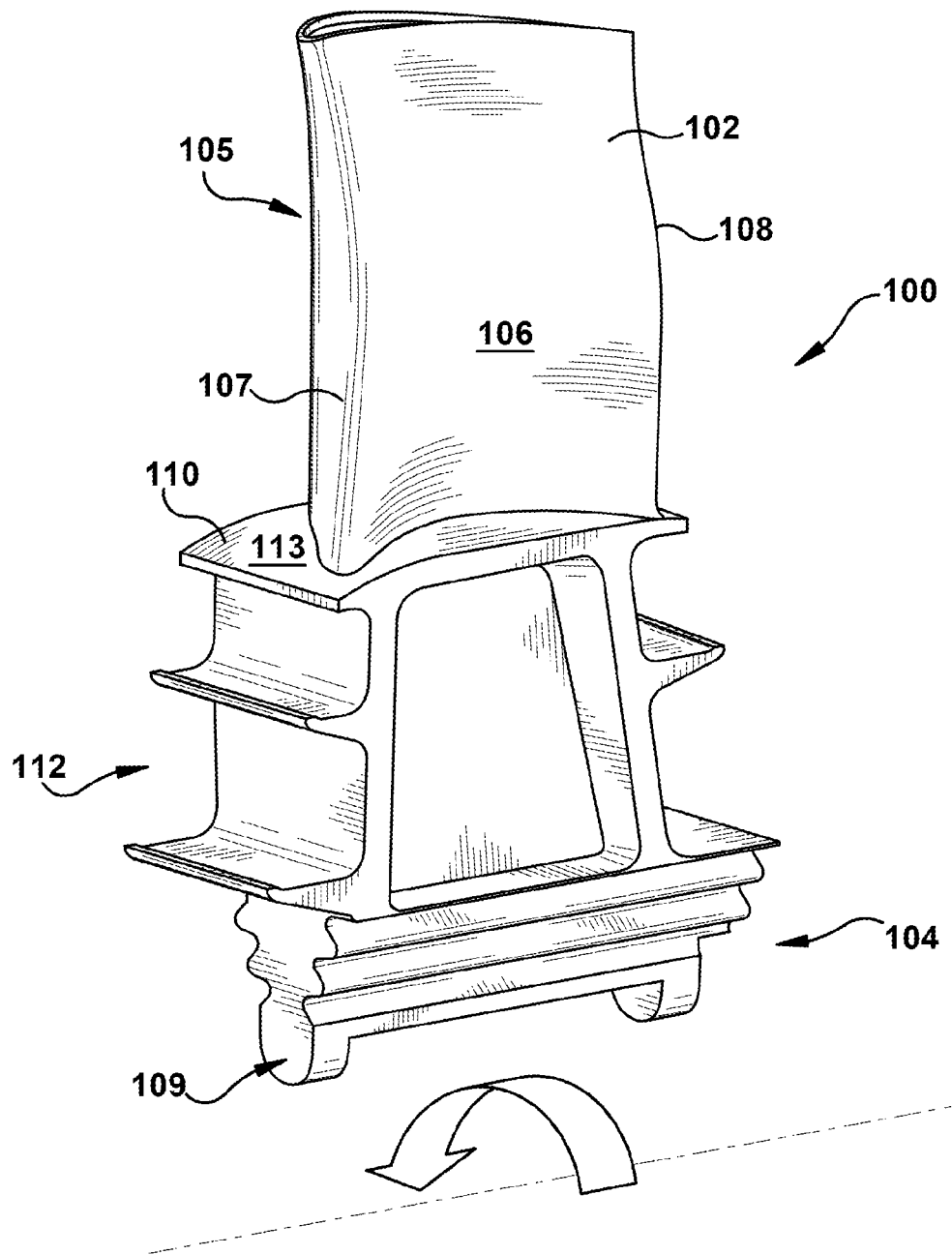
FIG. 1 illustrates a perspective view of an exemplary turbine rotor blade in which embodiments of the present invention may be employed.
Figure 2:
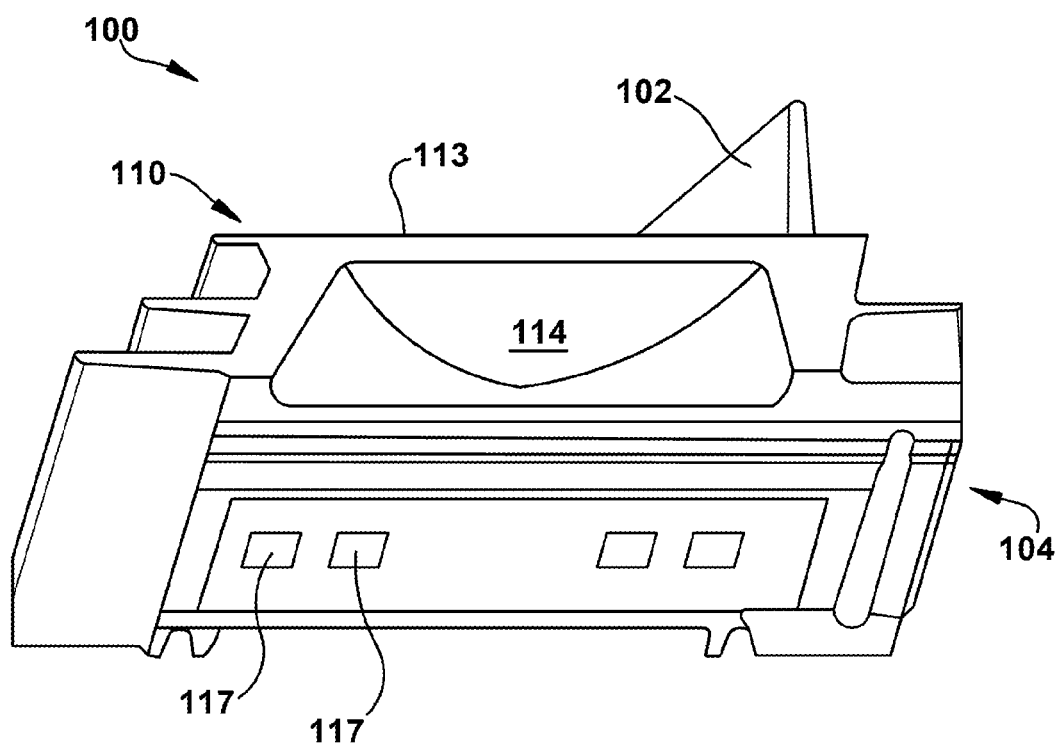
FIG. 2 illustrates an underside view of a turbine rotor blade in which embodiments of the present invention may be used.
Figure 3:
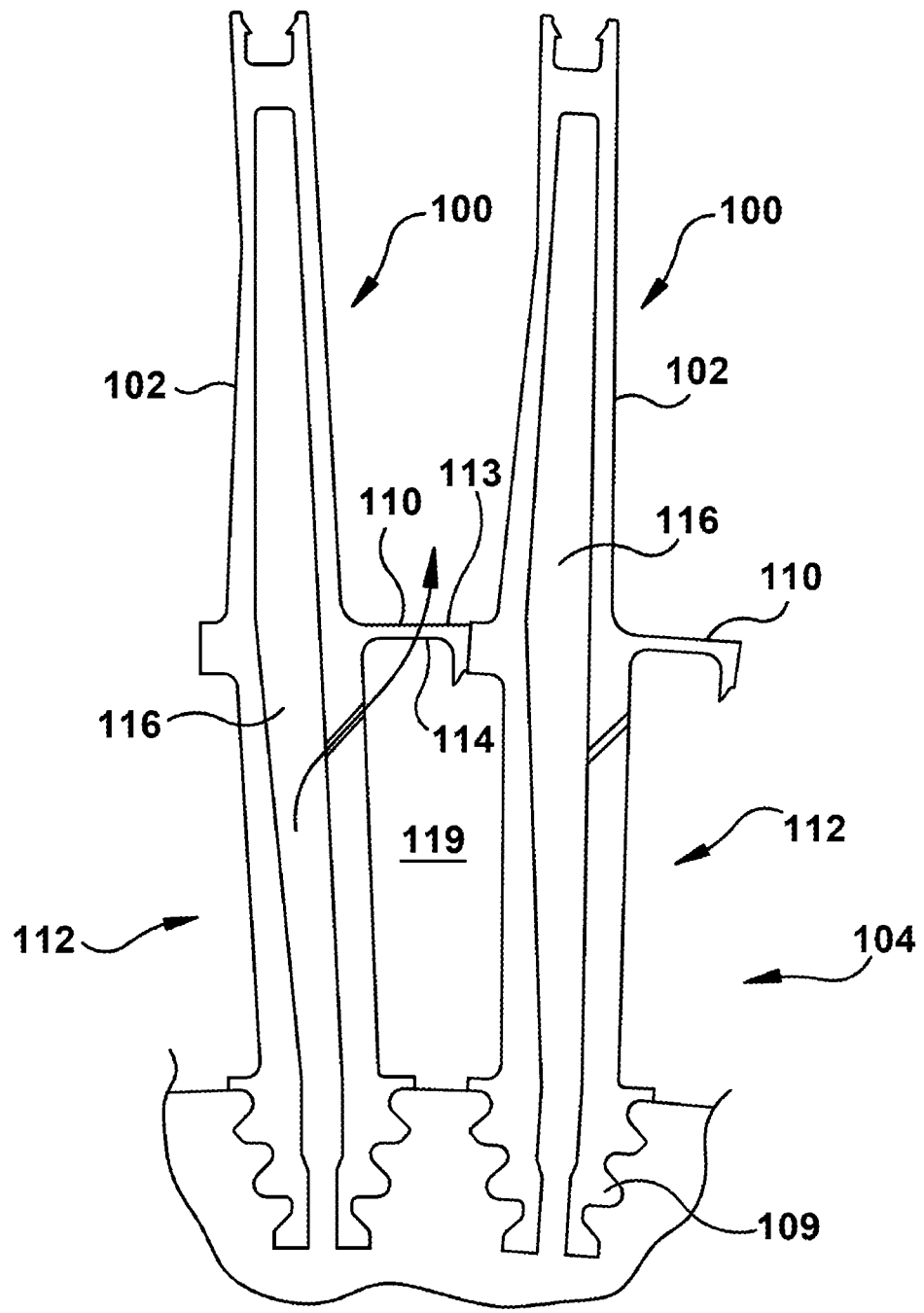
FIG. 3 illustrates a sectional view of neighboring turbine rotor blades having a cooling system according to conventional design.
Figure 4:
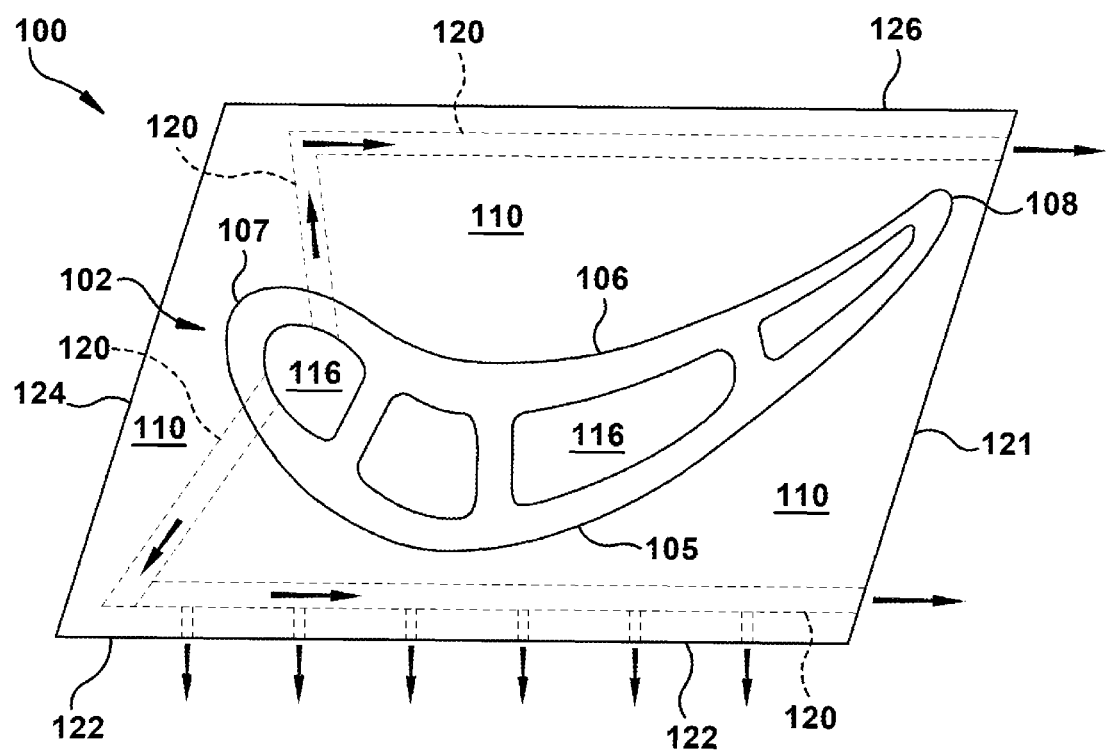
FIG. 4 illustrates a top view of a turbine rotor blade having a platform with interior cooling passages according to conventional design.
Figure 5:
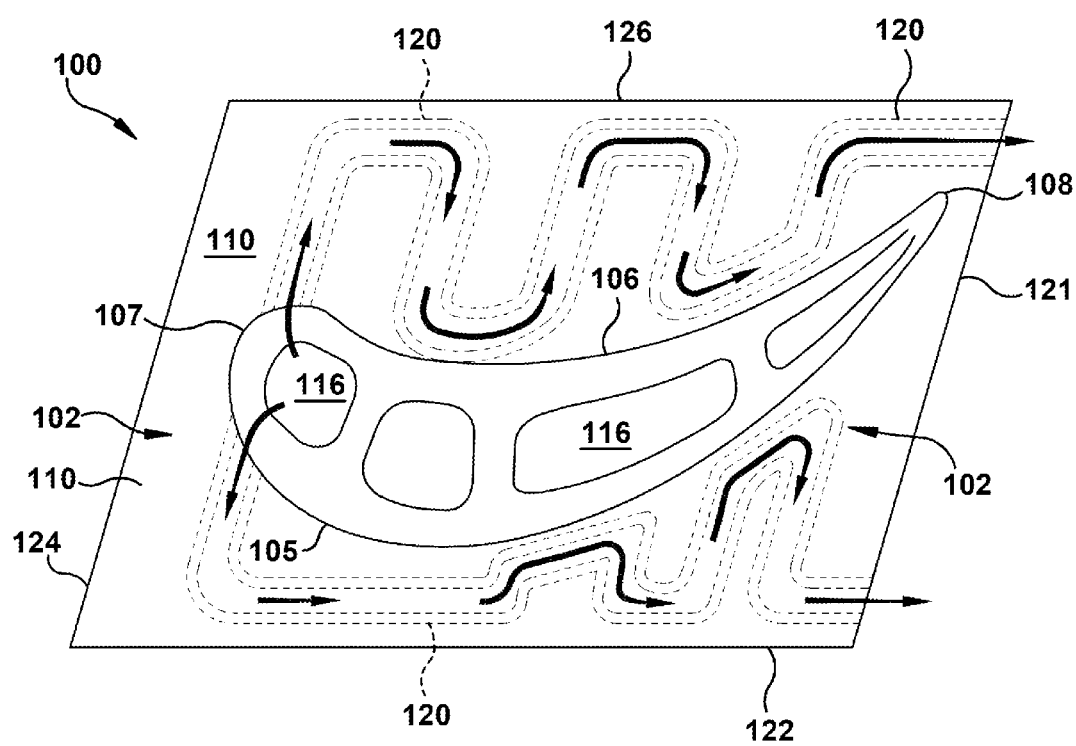
FIG. 5 illustrates a top view of a turbine rotor blade having a platform with interior cooling passages according to an alternative conventional design.
Figure 6:
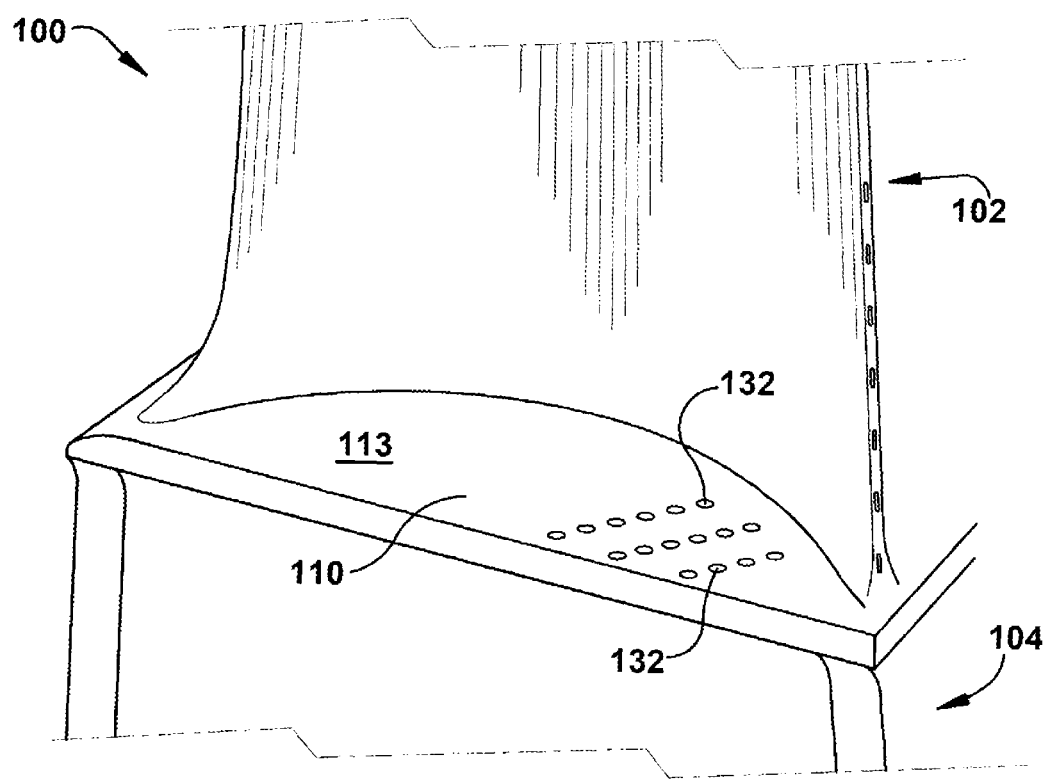
FIG. 6 is a perspective view of a turbine rotor blade having an exemplary platform configuration that may be modified according to an embodiment of the present application.
Figure 7:
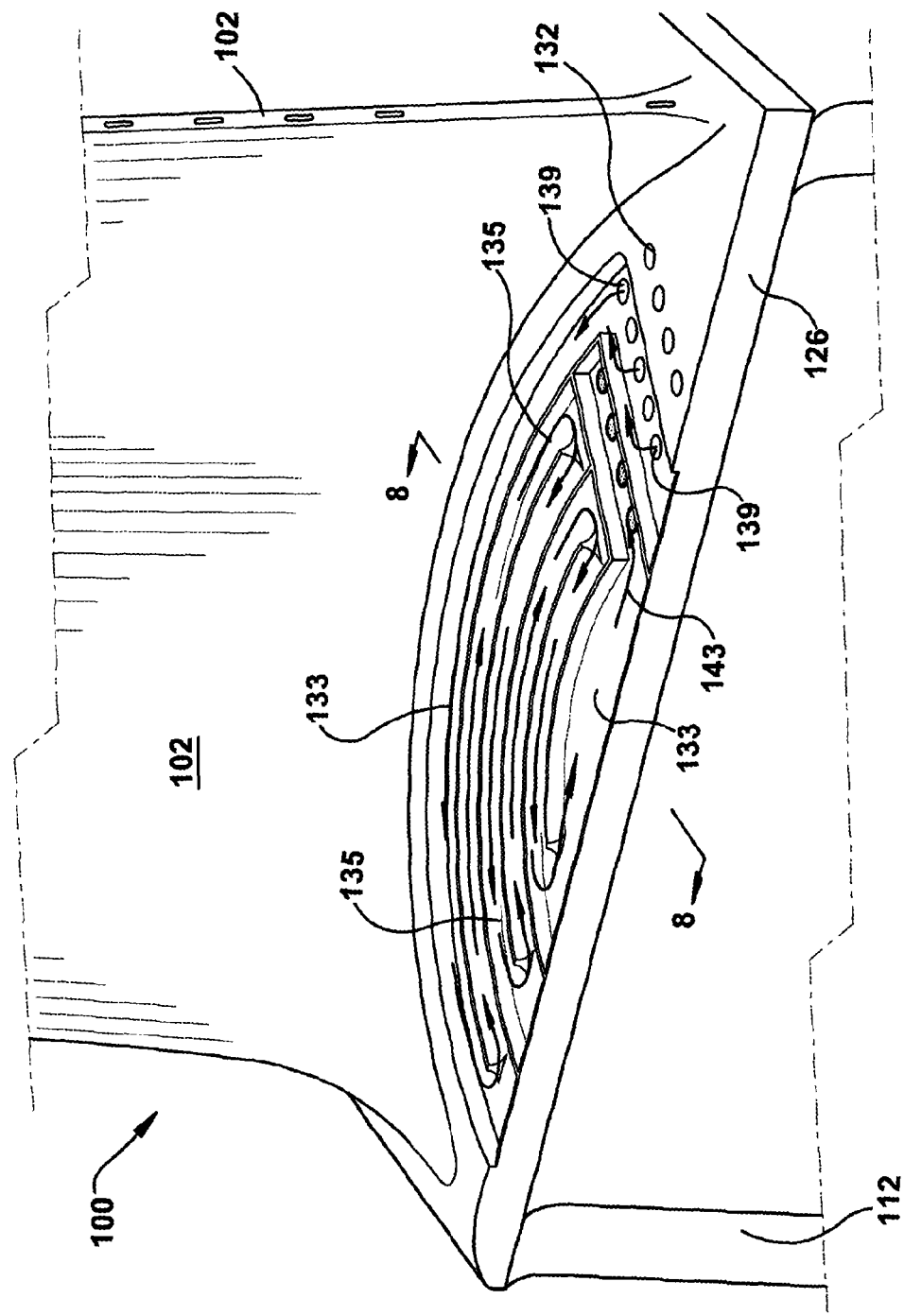
FIG. 7 is a perspective view of the turbine rotor blade of FIG. 6 after the platform topside has been reconfigured according to an exemplary embodiment of the present application.
Figure 8:
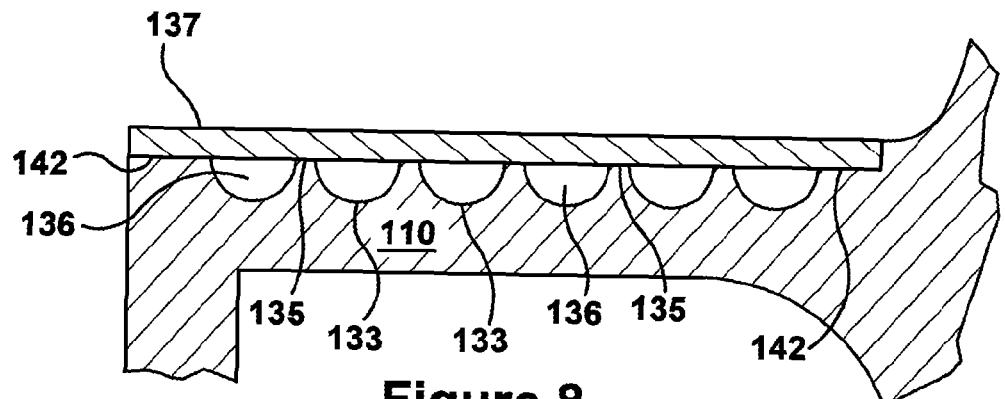
FIG. 8 is a cross-sectional view of the platform cooling passage that is formed once a coverplate in accordance with the present application is affixed to the platform topside of rotor blade of FIG. 7.
Figure 9:
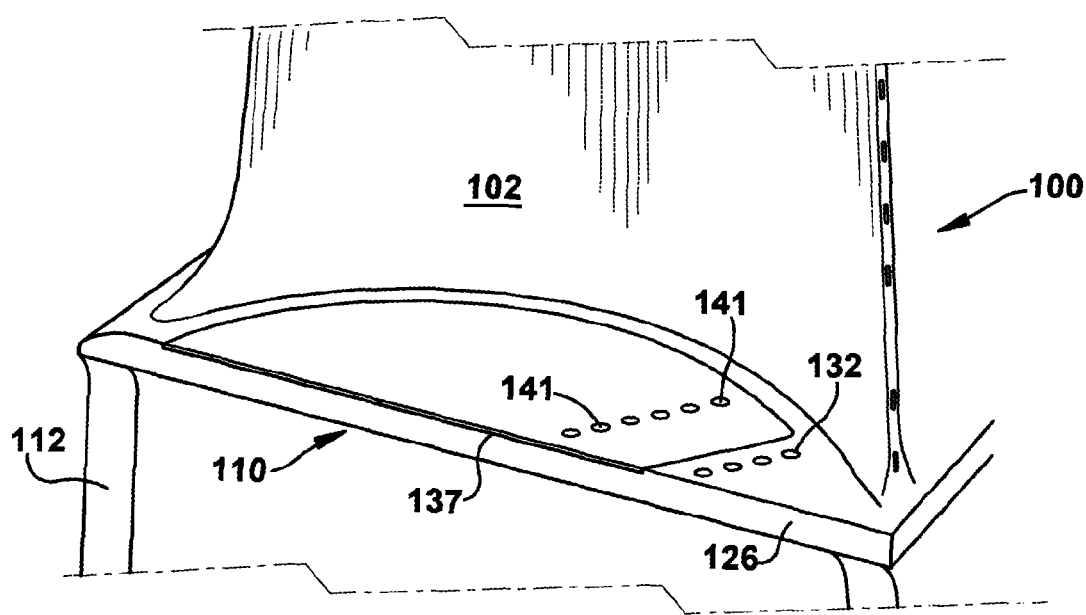
FIG. 9 is a perspective view of FIG. 7 after a coverplate in accordance with the present application is affixed to the platform topside.

Referring again to the figures, FIG. 6 provides a perspective view of a turbine rotor blade 100 having an exemplary platform configuration, which, as FIGS. 7-9 illustrate, may be modified according to exemplary embodiments of the present application. According to certain embodiments, the present invention includes methods for forming or manufacturing platform cooling passages in turbine rotor blades 100. FIG. 6 illustrates a turbine rotor blade 100 having a platform 110 at the interface between an airfoil 102 and a root 104. Along an outboard surface, the platform 110 may include a topside 113, which is substantially planar. As is typical of many conventional platform cooling strategies, the platform topside 113 may include a number of preexisting coolant outlets 132. It will be appreciated that the preexisting coolant outlets 132 may connect to an internal coolant feed and be employed as an outlet location for coolant that, during operation, is circulated through the interior of the platform 110. This type of cooling strategy cools the interior of the platform 110 as well as providing film cooling benefits to the platform topside 113.

According to an embodiment of the present invention, the platform 110 of FIG. 6 may be modified such that its cooling performance is revised and/or improved. FIG. 7 is a perspective view of the turbine rotor blade 100 of FIG. 6 after the platform topside 113 has been reconfigured according to an exemplary embodiment of the present application. As shown, pursuant to an exemplary embodiment, a recessed area 133 along the platform topside 113 has been formed. The recessed area 133 in this exemplary embodiment is located on the side of the platform 110 that coincides with the pressure face 106 of the airfoil 102. The recessed area 133 extends approximately between the base of the airfoil 102 to the pressure side edge 126 of the platform 110. In an embodiment of the present application, the recessed area 133 may be formed by one or more manufacturing methods, such as, but not limited to, machining, casting, and the like. In a preferred embodiment, the recessed area 133 is machined into the platform topside 113. This process, as described more below, may be used to reconfigure the platform cooling cavities of existing or used turbine rotor blade. Those of ordinary skill in the art will recognize that, traditionally, such reconfiguration required the manufacture of a new set of turbine rotor blades or expensive and time-consuming manufacturing processes. Per preferred embodiments of the present application, however, the same may be accomplished per simple machining processes. More specifically, per conventional machining processes, the recessed area 133 may be formed to include fluid directing structure 135 that directs cooling in a desired manner as the coolant passes through the recessed area during operation.

As illustrated in the cross-sectional view of FIG. 8, embodiments of the present invention, include a coverplate 137 and/or affixing the coverplate 137 over the recessed area 133. In this manner, a platform cooling passage 136 in accordance with the present application, is formed. It will be appreciated that the present invention include a step wherein a coverplate 137 of predetermined dimensions is formed and then affixed to the platform topside 113 in a predetermined location. The coverplate 137 may be made from any suitable material, such as steel, ceramics, or other conventional material suitable to the environment within the turbine engine. In exemplary embodiments, the coverplate 137 is configured to correspond to the shape of the recessed area 133 such that, once the coverplate 137 is affixed to the platform topside 113 in a desired manner, the coverplate 137 substantially encloses the recessed area 133 to form a platform cooling passage 136 of a predetermined configuration. As discussed in more detail below, the method may further include the forming of an inlet 139 through which, in operation, coolant enters the platform cooling passage 136, as well as the forming of an outlet 141 through which, in operation, coolant exits the platform cooling passage 136.

In certain preferred embodiments, the fluid directing structure 135 may be formed during the machining process in which the recessed area 133 is formed. As stated, the step of forming the recessed area 133 may include a conventional machining process that removes a desired amount of material from the platform topside 113. In exemplary embodiments, the step of forming the fluid directing structure 135 includes the step of machining the recessed area 133 in such a manner as to allow certain predetermined portions of the platform 110 to remain intact such that the intact portions form walls that divide the space and, in operation, direct a fluid flowing therethrough. It will be appreciated that, in this case, the fluid directing structure 135 comprises components that are integral to the platform 110.

Once the coverplate 137 is affixed to the platform topside 113, the outer radial surface of the platform within the formed platform cooling passage 136 may be described as being the floor of the platform cooling passage 136. Similarly, the inner radial surface of the coverplate 137 may be described as being the ceiling of the platform cooling passage 136. In certain exemplary embodiments, the fluid directing structure 135 includes wall-partitions that extend substantially from the floor to the ceiling of the platform cooling passage 136. As shown in FIG. 7, to enhance cooling, the fluid directing structure may be configured to define a winding path through the platform cooling passage 136. It will be appreciated that the winding path is configured to fluidly connecting the inlet 139 to the outlet 141.

As shown, the platform cooling passage 136 according to the present invention may be formed on the side of the platform 110 that coincides with the pressure side 106 of the airfoil 102. Accordingly, in profile, a preferred embodiment of the coverplate 137 includes a curved edge that approximately coincides in shape to the curved profile of a pressure side 106 of the airfoil 102 (i.e., where the pressure side 106 of the airfoil 102 connects to the platform 110. The straight edge of the coverplate 137 may approximately coincide in shape to the pressure side edge 126 of the platform 110.

The coverplate 137 may be attached to the platform topside 113 using various conventional techniques. In certain some embodiments, the coverplate 137 is detachedly attached to the platform 110. As used herein, this type of attachment is meant to include any attachment that may reasonable be reversed such that the coverplate 137 may be removed from the platform 110 in such a way as to allow the coverplate 137 and/or the rotor blade 100 to be reused. Attachment methods that may include in this description, for example, may include certain types of welding, brazing, adhesives, mechanical retainment, and the like. As part of attaching the coverplate 137, conventional steps also may be taken to seal the formed platform cooling passage 136 such that unwanted leakage does not occur. That is, the platform cooling passage 136 may be sealed such that coolant enters and exits in a desired manner (i.e., through the inlets 139 and outlets 141). In certain embodiments, which are discussed in more detail below, the sealing results in a closed coolant circuit that directs the coolant to another region of the rotor blade 100. In this manner, coolant may be circulated through other parts of the turbine blade 100. Those of ordinary skill in the art will appreciate that any conventional sealing means may be used between the coverplate 137 and the platform topside 113 for this purpose. For example, mechanical gasket, chemical sealant and the like may be used.

In exemplary embodiments, the coverplate 137 and the recessed area 133 are formed such that, once affixed, an outer radial surface of the coverplate 137 resides approximately flush in relation to the platform topside 113 that surrounds the coverplate 137. In certain preferred embodiments, the recessed area 133 may be formed to include a step 142. As shown, the step 142, in exemplary embodiments, may be positioned along an outer rim of the recessed area 133. The step 142 may be configured to support the coverplate 137 at a desired radial height within the recessed area 133. In exemplary embodiments, the desired radial position includes one in which a predetermined clearance between the floor and the ceiling of the platform cooling passage 136 is achieved. The desired radial position also may include one in which an outer radial surface of the coverplate 137 resides approximately flush in relation to the surface of the platform topside 113 that surrounds the coverplate 137.

It will be appreciated that embodiments of the present invention may be employed in refurbishing existing or used turbine rotor blades 100, which, as used herein, may include modifying any turbine rotor blade 100 that was originally designed to have a different interior cooling passage configuration. In this manner, a preconfigured turbine rotor blade 100 may be modified to include enhanced or revised active cooling characteristics and performance. It will be appreciated, that methods described herein may be used to effectively and cost-efficiently achieve this objective.

For example, the platform topside 113 of a preexisting turbine rotor blade 100 may have preexisting coolant outlets 132. Exemplary embodiments of the present invention include methods by which these may be efficiently incorporated into a revised interior cooling passage design. In such instances, the recessed area 133 may be configured to include a position on the platform topside 113 that overlaps the position of at least a portion of the preexisting coolant outlets 132. The recessed area 133 and coverplate 137 then may be formed such that the preexisting coolant outlet 132 opens into the resulting platform cooling passage 136, as shown in FIG. 7. More specifically, the area having the preexisting coolant outlets 132 may be machined such that the radial height of the former outlet is reduced, thereby allowing a clearance to exist between the newly formed inlet 139 and the coverplate 137 (i.e., once the coverplate 137 is installed to enclose the platform cooling passage 136). It will be appreciated that, in this manner, an inlet 139 may be created from a former outlet such that, in operation, coolant which previously exited the turbine rotor blade 10 via the former outlet, now flows into the platform cooling passage 136 via the newly-formed inlet 139.

In certain preferred embodiments, one or more outlets 141 may be formed through the coverplate 137. Apertures may be formed through the coverplate 137 at predetermined locations to form such outlets 141. In this manner, once the coverplate 137 is affixed, the outlets 141 provide an exit location for all or some of the coolant flowing through the platform cooling passage 136. The outlets 141 may be sized to provide desired flow characteristics through the platform cooling passage 136, the efficient metering of coolant, and/or desired film cooling characteristics once the coolant is released along the platform topside 113. As shown in FIG. 7, the fluid directing structure 135 may be configured to define a winding path through the recessed area 133. The winding path may be configured to direct coolant on a circuitous route from the inlet 139 to the outlet 141, thereby enhancing the cooling provided to the platform 110.

As further shown in FIG. 7, some of the preexisting coolant outlets 132 may be plugged with a plug 143. The plug 143 is configured to prevent or limit the flow of coolant from the outlet 132 by blocking all of the outlet or a portion thereof. In some embodiments, plugs 143 may be used to direct fluid in a manner that conforms better to the new cooling arrangement of the platform 110. As illustrated by FIGS. 7 and 9, in one embodiment, the plugs 143 are used to plug preexisting coolant outlets 132 such that coolant is diverted into the other preexisting coolant outlets 132 that remain open. In preferred embodiments, the preexisting coolant outlets 132 that remain unplugged may be those that coincide with the location of the intended upstream end of the platform cooling passage 136. Whereas, those preexisting coolant outlets 132 that are plugged may be those that coincide with an intended downstream location of the platform cooling passage 136. In such cases, the outlets 141 formed through the coverplate 137 may be at locations near where the plugged preexisting coolant outlets 132 are located. In this manner, film cooling that previously occurred at this location continues during operation. It will be appreciated that FIG. 9, which provides a perspective view of the rotor blade of FIG. 7 after a coverplate 137 in accordance with the present application is affixed to the platform topside 113, illustrates this type of configuration.

Figure 10:
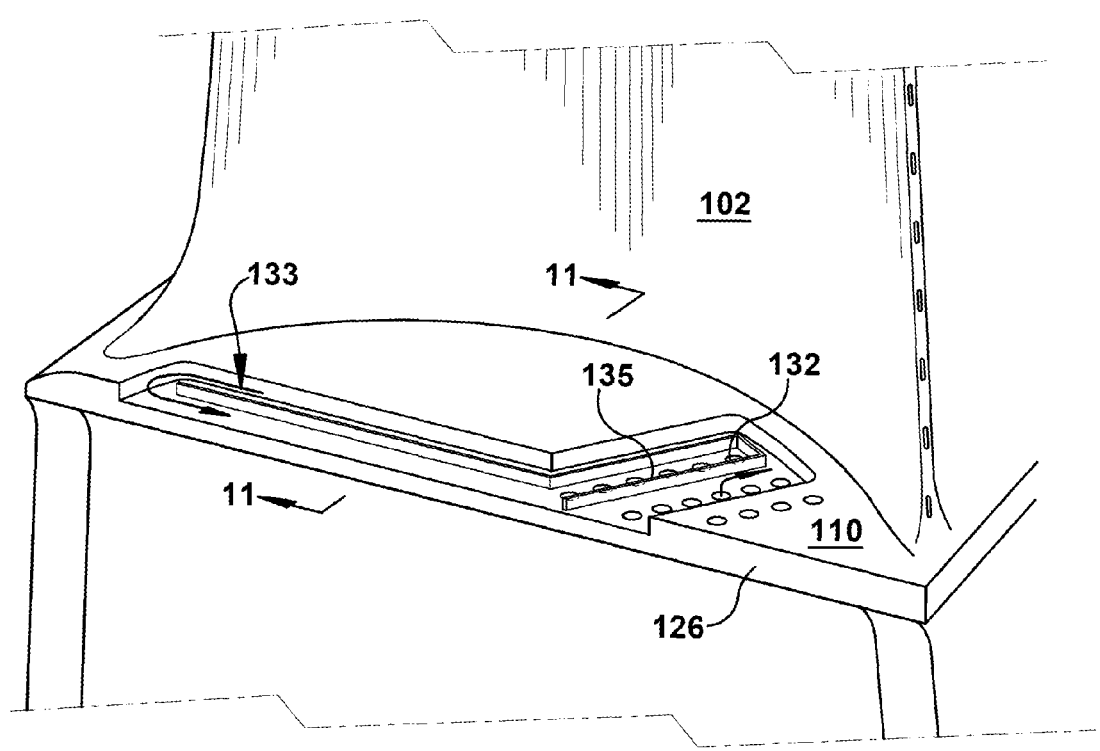
FIG. 10 is a perspective view of the turbine rotor blade of FIG. 6 after the platform topside has been reconfigured according to an alternative embodiment of the present application.
Figure 11:
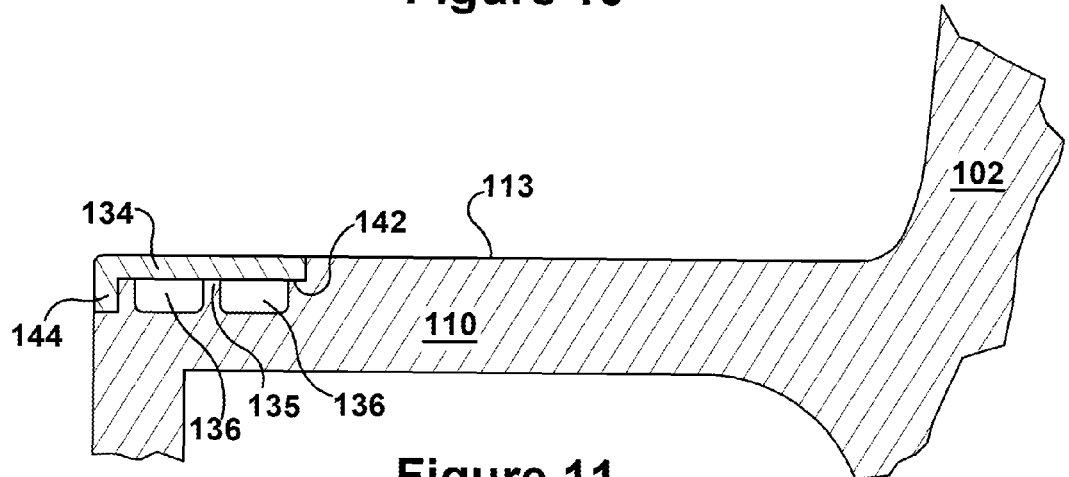
FIG. 11 is a cross-sectional view of the platform cooling passage that is formed once a coverplate in accordance with the present application is affixed to the platform topside of rotor blade of FIG. 10.

FIG. 10 is a perspective view of the turbine rotor blade of FIG. 6 after the platform topside 113 has been reconfigured according to an alternative embodiment of the present application. The recessed area 133 is again formed on the pressure side 106 of the airfoil 102, but, in this case, the recessed area 133 is created with a smaller footprint that concentrates the cooling toward the edge of the platform 110. FIG. 11 provides a cross-sectional view of the platform cooling passage 136 that is formed once a coverplate 137 is affixed to the platform topside 113. FIGS. 10 and 11 are provided to illustrate how embodiments of the present invention may be applied to form platform cooling passages 136 of different configurations. It will be appreciated that the embodiment of FIGS. 10 and 11 may be formed using the same processes as described above in relation to the embodiment of FIGS. 7-9. It will further be appreciated that the different variations discussed above in relation to FIGS. 7-9 may be applied in similar manner to embodiments of the present invention that have platform cooling passages of differing configurations. That is, the present invention is not limited to these two alternative embodiments, which are intended only to illustrate examples of preferred embodiments.

Figure 12:
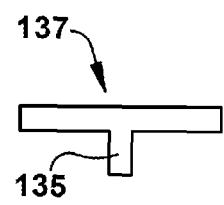
FIG. 12 is a cross-sectional view of an alternative embodiment of a coverplate in which the fluid directing structure is integral to the coverplate.

In FIG. 11, it will be appreciated that the coverplate 137 includes a lip portion 144 that is used to enclose the platform cooling passage 136 along the pressure side edge 126 of the platform 110. FIG. 11 also depicts fluid directing structure 135 that is integral to the platform 110, which, as described above, may be formed by allowing certain areas of the platform 110 to remain intact while the areas around these areas are machined down. In alternative embodiments, it will be appreciated that the fluid directing structure 135 also may be formed as a component that is integral to coverplate 137. An example of a coverplate 137 that includes integral fluid directing structure 135 is provided in the schematic cross-sectional view of FIG. 12. In this case, the step of forming the coverplate 137 may include forming the fluid directing structure 135 as an integral component that juts from an inner radial side of the coverplate 137. As before, the fluid directing structure 135 may be configured as partition walls that, upon proper installation of the coverplate 137, extend from the floor to the ceiling of the recessed area 133.

Figure 13:
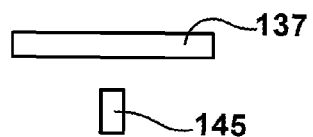
FIG. 13 is a cross-sectional view of an alternative embodiment of a coverplate in which the fluid directing structure is not an integral component of the coverplate or the platform.

In other alternative embodiments, the fluid directing structure 135 may be formed as a non-integral component to both the coverplate 137 and the platform 110, an illustration of which is provided in FIG. 13. In this case, the fluid directing structure 135 may be formed as an insert 145 that is attached to the coverplate 137 or the platform 110 per conventional means. Alternatively, the insert 145 may be neither rigidly attached to the coverplate 137 nor the platform 110, but formed to fit snugly within the platform cooling passage 136 such that its position is substantially maintained during operation. FIG. 13 is a cross-sectional view of such an embodiment. Accordingly, methods of the present invention, thus, may further include the step of installing the insert 145 within the recessed area 133 before the coverplate 137 is affixed to the platform topside. The insert 145 may be configured pursuant to predetermined dimensions such that it fits within the platform cooling passage 136 in a desired manner. Upon installation, the insert 145 may be configured to form the partition-walls that form the winding path through the platform cooling passage 136.

Figure 14:
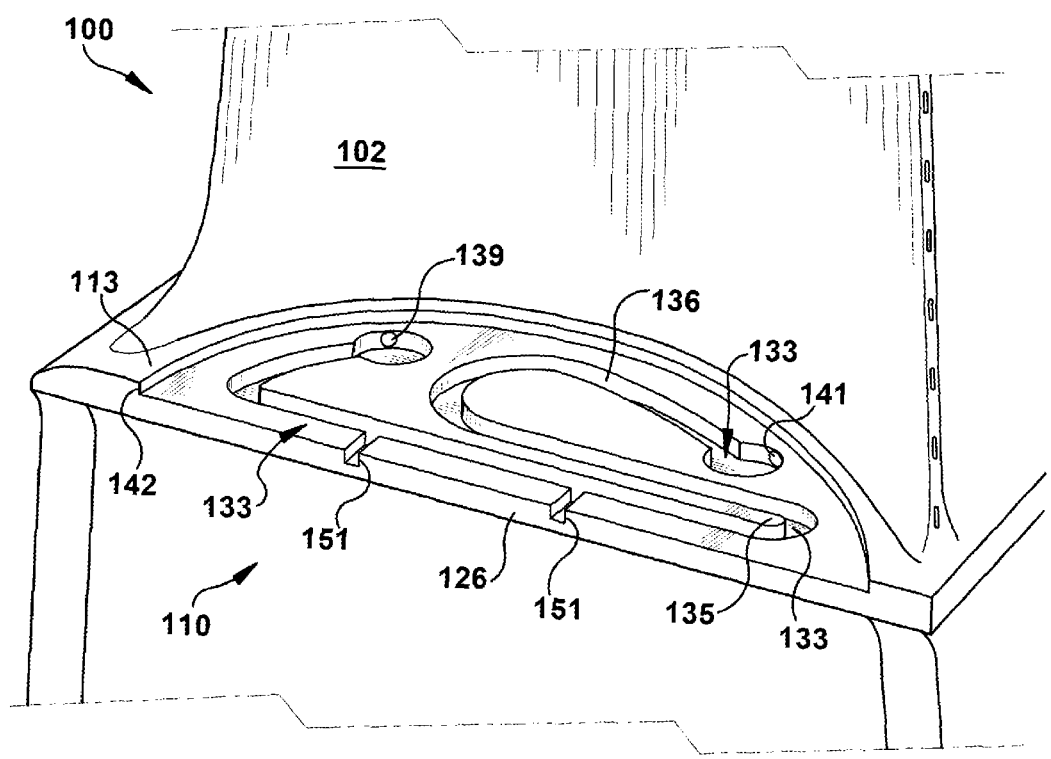
FIG. 14 is a perspective view of a platform (before a coverplate is affixed thereto) having a serpentine cooling channel according to an alternative embodiment of the present application.
Figure 15:
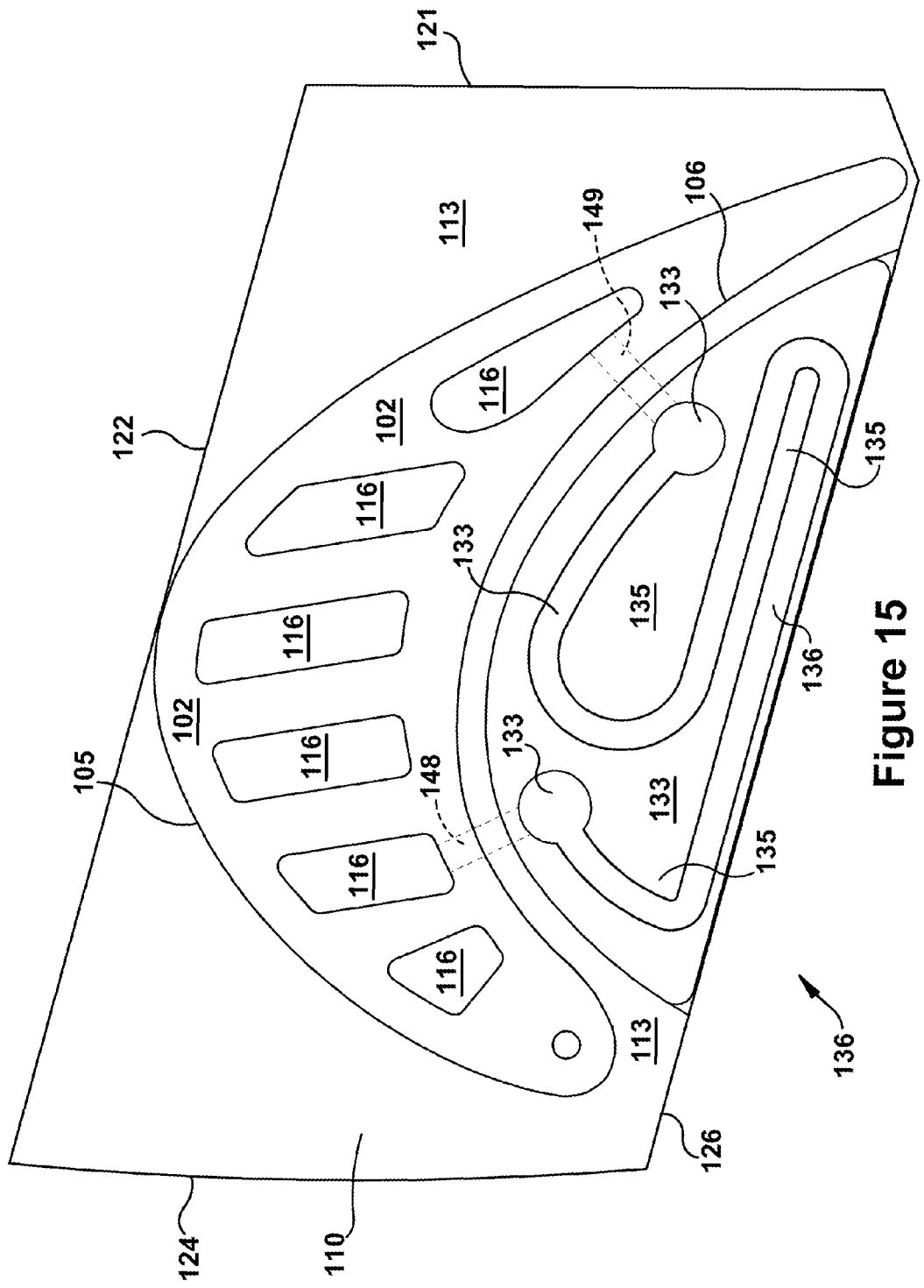
FIG. 15 is a top view of the platform of FIG. 12, further demonstrating the incorporation of a high-pressure connector and a low-pressure connector according to an alternative embodiment of the present application.

FIG. 14 is a perspective view of a recessed area 133 on a platform 110 according to another alternative embodiment (which is depicted before a coverplate 137 is affixed to enclose the recessed area 133 and form the platform cooling passage 136). In this example, the recessed area 133 is formed as a serpentine channel in the platform topside 113. FIG. 15 provides a top view of the same exemplary embodiment, which more clearly illustrates how a high-pressure connector 148 and a low-pressure connector 149 may be incorporated into embodiments such that operational benefits are achieved.

It will be appreciated that turbine blades that are cooled via the internal circulation of a coolant typically include an interior cooling passage 116 that extends radially outward from the root, through the platform region, and into the airfoil, as described above in relation to several conventional cooling designs. Certain embodiments of the present invention may be used in conjunction with this type of interior cooling passage 116 to enhance or enable efficient active platform cooling. The exemplary embodiment of FIGS. 14 and 15 are discussed in connection with a common design, which includes an interior cooling passage 116 that has a winding or serpentine configuration. The serpentine path is typically configured to allow a one-way flow of coolant and includes features that promote the exchange of heat between the coolant and the surrounding rotor blade 100. In operation, a pressurized coolant, which typically is compressed air bled from the compressor (though other types of coolant, such as steam, also may be used with embodiments of the present invention), is supplied to the interior cooling passage 116 through a connection formed through the root 104. The pressure drives the coolant through the interior cooling passage 116, and the coolant convects heat from the surrounding walls.

As the coolant moves through the interior cooling passage 116, it will be appreciated that there is pressure loss. Accordingly, the coolant in the upstream portions of the interior cooling passage 116 having a higher pressure than coolant in downstream portions. This pressure differential may be used to drive coolant across or through interior cooling passages formed in the platform, while also recapturing the coolant for a downstream use. It will be appreciated that the present invention may be used in rotor blades 100 having internal interior cooling passages of different configurations and is not limited to interior cooling passages having a serpentine form. Accordingly, as used herein, the term "interior cooling passage" is meant to include any passage or hollow channel through which coolant may be circulated in the rotor blade. As provided herein, the interior cooling passage 116 of the present invention extends to at least to the approximate radial height of the platform 116, and may include at least one region of relatively higher coolant pressure (which, hereinafter, is referred to as a "region of high pressure" and, in some cases, may be an upstream section within a serpentine passage) and at least one region of relatively lower coolant pressure (which, hereinafter, is referred to as a "region of low pressure" and, relative to the region of high pressure, may be a downstream section within a serpentine passage).

Accordingly, an embodiment of the present invention includes forming the inlet 139 by machining a high-pressure connector 148. The high-pressure connector 148 may include a configuration that allows it to connect the upstream end of the platform cooling passage 136 to a high-pressure coolant region of the interior cooling passage 116, as illustrated in FIG. 15. In addition, the step of forming the outlet 141 may include machining a low-pressure connector 149. The low-pressure connector 149 may include a configuration such that it connects a downstream end of the platform cooling passage 136 to the low-pressure coolant region of the interior cooling passage 116, as indicated in FIG. 15. The formation of the high-pressure connector 148 and the low-pressure connector 149 may be simplified by the access provided by the formation of the recessed area 133. That is, from inside the recessed area 133, the machining of both the high and low pressure connectors 148, 149 may be done via a line of sight drilling process, which is efficient and cost-effective. As such, the step of forming the high-pressure connector 148 may be completed after at least a first predetermined section of the recessed area 133 is formed, and the machining of the high-pressure connector 149 may include a start position within the first predetermined section of the recessed area 133. The step of forming the low-pressure connector may be completed after at least a second predetermined section of the recessed area 133 is formed, and the machining of the low-pressure connector may include a start position within the second predetermined section of the recessed area 133. It will be appreciated that, for such embodiments, the inlet 139, outlet 141, and the platform coolant passage 136 may be configured such that coolant is not released from the platform region of the rotor blade. Instead, coolant may flow through the platform cooling passage 136 and be returned to the interior cooling passage 116, where it might be used further. Accordingly, the step of affixing the coverplate 137 to the platform topside 113 may include sealing the interface between the coverplate 137 and the platform topside 113 such that, in operation, coolant exits the platform cooling passage 136 substantially through the outlet 141 only.

In another variation, an example of which is depicted in FIG. 14, the platform cooling passage may be configured to release a small amount of coolant within the slashface cavity (i.e., the cavity formed between the platforms of two adjacent rotor blades). In this case, smaller channels may be machined into the platform 110 that extend from the platform cooling passage 136 to an outlet at the slashface 126. Once the coverplate 137 is attached, it will be appreciated that slashface outlets or apertures 151 are created. As one of ordinary skill in the art will appreciate, the slashface apertures 151 may be configured with a flow area that directs an impinged flow of coolant into the slashface cavity. As this is a difficult region to cool, this efficient method by which slashface apertures 151 may be formed will result in reduced manufacturing costs. The slashface apertures 151 may be configured to have a flow area that meters flow therethrough such that a desired level of flow remains in the other areas of the platform Those of ordinary skill in the art will appreciate that the platform cooling passages of the present invention may be used to efficiently retrofit existing turbine rotor blades with new platform cooling strategies. Further, the platform cooling passages 136 of the present invention may be configured to utilize existing interior cooling passages 116 of turbine rotor blades 110, which provides flexibility in retrofitting existing blades in varying ways. Platform cooling passages 136 of the present invention also may be efficiently tuned or adjusted once performance is evaluated or operating criteria is modified. That is, various aspects of the coverplate 137, the recessed area 133, and the fluid directing structure 135 may be altered to optimize cooling of the platform 110 or meet changing demands. Thus, the platform cooling passage 136 may be tailor-made to suit various turbine rotor blade configurations, conditions, and cooling demands. In addition, the platform cooling passages 136 of the present invention, given the straight-forward machining processes that may be used may be cost effectively manufactured. In addition, the coverplate 137 may be manufactured separately from the various components of turbine rotor blade 100, which may also reduce cost and complexity in the manufacturing process.

Figure 16:
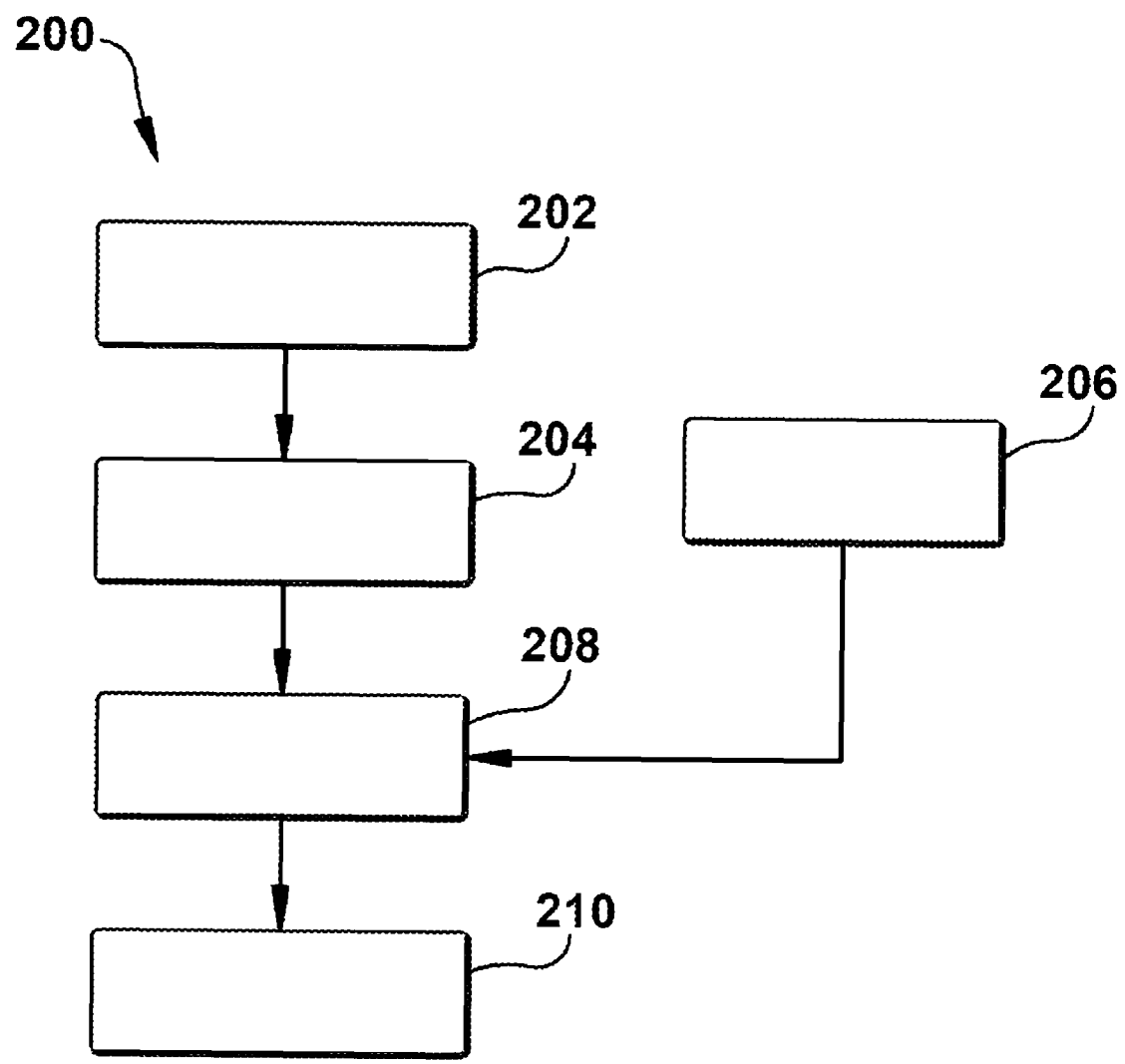
FIG. 16 is an exemplary method of creating a platform cooling arrangement according to an embodiment of the present application.

FIG. 16 illustrates a flow diagram 200 depicting an exemplary method of creating the platform cooling passage 136, according to an embodiment of the present application. It will be appreciated that this method includes many of the steps described above, but is exemplary only, as other embodiments or steps are possible. The flow diagram 200 may begin at a step 202 where the recessed area 133 is machined into the platform topside 113 in a predetermined location. In certain embodiments, the preferred location for the recessed area 133 is the pressure side 126 of the airfoil 102. The formation of the recessed area 133 may include the formation of the fluid directing structure 135.

At step 204, the high-pressure connector 148 and the low-pressure connector 149 may be formed. The high-pressure connector 148 may have a predetermined configuration and location such that it connects a high-pressure coolant region of the interior cooling passage 116 to the eventual location of an upstream end of the platform cooling passage 136. Likewise, the low-pressure connector 149 may have a predetermined configuration and location such that it connects a low-pressure coolant region of the interior cooling passage 116 to the eventual location of a downstream end of the platform cooling passage 116. It will be appreciated that the formation of the connectors 148, 149 may be completed using a relatively inexpensive machining process, particularly given the access that is available to the relevant area of the blade 100 once the formation of the recessed area 133 is complete (and before the coverplate 137 is attached).

At a step 206, the coverplate 137 may be fabricated according to desired specifications. It will be appreciated that fabricating the coverplate 137 separately simplifies the manufacturing process.

At a step 208, the coverplate 137 may be attached to the platform topside 113, thereby forming the platform cooling passage 136. Finally, at a step 210, additional steps may be taken to seal the formed the platform cooling passage 136. As stated, sealing the platform cooling passage 136 and the connections it makes with the connectors 148, 149 may substantially result in a closed coolant circuit between the high-pressure connector 148 and the low-pressure connector 149. Other steps consistent with the description above are also possible.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes, and modifications. Such improvements, changes, and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. A method for creating a platform cooling passage in a turbine rotor blade, wherein the turbine rotor blade comprises a platform at an interface between an airfoil and a root, wherein the platform includes a platform topside along an outboard surface, the method comprising the steps of:
   forming a recessed area along the platform topside;
   forming a coverplate; and
   affixing the coverplate to the platform topside;
   wherein the coverplate is configured to correspond to the shape of the recessed area such that, when affixed to the platform topside in a desired manner, the coverplate substantially encloses the recessed area to form the platform cooling passage therein.

2. The method according to claim 1, further comprising the steps of:
forming an inlet through which, in operation, coolant enters the platform cooling passage;
forming an outlet through which, in operation, coolant exits the platform cooling passage; and
forming fluid directing structure within the platform cooling passage;
wherein:
once the coverplate is affixed to the platform topside, an outer radial surface of the platform within the platform cooling passage area comprises a floor of the platform cooling passage, and the inner radial surface of the coverplate comprises a ceiling of the platform cooling passage;
the fluid directing structure comprises wall-partitions that extend substantially from the floor to the ceiling of the platform cooling passage; and
the wall-partitions are configured to define a winding path through the platform cooling passage, the winding path configured to fluidly connecting the inlet to the outlet.

3. The method according to claim 2, wherein the step of forming the coverplate includes forming the fluid directing structure along an inner radial side of the coverplate; wherein the fluid directing structure comprises a component integral to the coverplate.

4. The method according to claim 2, wherein the step of forming the recessed area includes forming the fluid directing structure within the recessed area; wherein the fluid directing structure comprises a component integral to the platform.

5. The method according to claim 4, wherein the step of forming the recessed area includes machining the recessed area into the platform topside; and
wherein the step of forming the fluid directing structure includes the step of machining the recessed area in such a manner as to allow certain predetermined portions of the platform to remain intact such that the predetermined intact portions form the wall partitions;
wherein at least some of the wall partitions comprises a radial height such that the coverplate is supported in a desired radial position by the wall partitions.

6. The method of claim 5, further comprising the step of forming a slashface aperture;
wherein the step of forming the slashface aperture includes machining a channel that extends from the recessed area to a slashface of the platform; and
wherein the channel is configured such that the coverplate, once affixed to the platform topside, encloses the channel to form the slashface aperture.

7. The method according to claim 2, wherein the step of forming the fluid directing structure includes forming an insert, the insert comprising a component that is not integral to the platform and not integral to the coverplate;
further comprising the step of installing the insert within the recessed area before the coverplate is affixed to the platform topside;
wherein the insert is configured pursuant to predetermined dimensions such that the insert fits within the platform cooling passage in a desired manner; and
wherein, upon installation, the insert is configured to form the partition-walls that form the winding path through the platform cooling passage.

8. The method according to claim 2, wherein:
the rotor blade includes an interior cooling passage formed therein that extends from a connection with a coolant source at the root of the rotor blade to at least the approximate radial height of the platform, wherein, in operation, the interior cooling passage comprises at least a high-pressure coolant region and a low-pressure coolant region;
the step of forming the inlet comprises machining a high-pressure connector, the high-pressure connector comprising a configuration such that it connects an upstream end of the platform cooling passage to the high-pressure coolant region of the interior cooling passage; and
the step of forming the outlet comprises machining a low-pressure connector, the low-pressure connector comprising a configuration such that it connects a downstream end of the platform cooling passage to the low-pressure coolant region of the interior cooling passage.

9. The method according to claim 8, wherein:
the step of forming the high-pressure connector is completed after at least a first predetermined section of the recessed area is formed, the machining of the high-pressure connector comprising a start position within the first predetermined section of the recessed area;
the step of forming the low-pressure connector is completed after at least a second predetermined section of the recessed area is formed, the machining of the low-pressure connector comprising a start position within the second predetermined section of the recessed area; and
wherein the step of affixing the coverplate to the topside of the platform includes sealing the interface between the coverplate and the topside of the platform such that, in operation, coolant exits the platform cooling passage substantially through the outlet only.

10. The method according to claim 2, wherein the forming the recessed area includes forming a serpentine shaped channel that extends along the platform topside such that once the coverplate substantially encloses the recessed area, a serpentine platform cooling passage is formed.

11. The method according to claim 2, wherein, in profile, the coverplate comprises a curved edge and a straight edge, the curved edge of the coverplate approximately coinciding in shape to the curved profile of a pressure side of the airfoil where the pressure side of the airfoil connects to the platform, and the straight edge of the coverplate approximately coinciding in shape to the pressure side edge of the platform; and
wherein the step of forming the recessed area comprises machining the recessed area in the platform topside of the pressure side edge of the platform.

12. The method according to claim 2, wherein the coverplate and the recessed area are formed such that, once affixed, an outer radial surface of the coverplate resides approximately flush in relation to the platform topside that surrounds the coverplate.

13. The method according to claim 2, wherein the recessed area is formed to include a step, wherein the step is positioned along an outer rim of the recessed area and configured to support the coverplate at a desired radial height within the recessed area.

14. The method according to claim 13, wherein the desired radial position comprises one in which a predetermined clearance between the floor and the ceiling of the platform cooling passage is achieved; and
wherein the desired radial position comprises one in which an outer radial surface of the coverplate resides approximately flush in relation to the platform topside that surrounds the coverplate.

15. The method according to claim 2, wherein the turbine rotor blade comprises a used turbine rotor blade.

16. The method according to claim 15,
wherein the topside of the platform comprises a plurality of preexisting coolant outlets, and wherein the preexisting coolant outlets comprises a position within the area on platform topside in which the recessed area will be formed;

further comprising the steps of:
forming an aperture through the coverplate in a predetermined location that, once the coverplate is affixed, comprises an outlet from the platform cooling passage that is formed; and
forming the recessed area such that at least one of the preexisting coolant outlets opens into the platform cooling passage and thereby provides an inlet thereto, wherein the inlet is configured such that, in operation, coolant which previously exited the turbine rotor blade via the preexisting coolant outlet now flows into the platform cooling passage via the inlet.

17. The method according to claim 15, further comprising the step of plugging at least one of the preexisting outlets; wherein
at least one preexisting coolant outlet remains unplugged, the unplugged preexisting coolant outlet comprising a location near an upstream end of the platform cooling passage; and
the at least one preexisting outlet that is plugged comprises a location near the downstream end of the platform cooling passage.

18. The method according to claim 17, further comprising the step of forming fluid directing structure within the platform cooling passage;
wherein once the coverplate is affixed to the platform topside, an outer radial surface of the platform within the recessed area comprises a floor of the platform cooling passage, and an inner radial surface of the coverplate comprises a ceiling of the platform cooling passage;
wherein the fluid directing structure comprises wall-partitions that extend substantially from the floor to the ceiling of the platform cooling passage; and
wherein the wall-partitions are configured to define a winding path through the recessed area, the winding path formed to direct coolant from the inlet to the outlet.

19. A platform cooling passage in a turbine rotor blade having a platform at an interface between an airfoil and a root, wherein the platform includes a platform topside along an outboard surface, the platform cooling passage comprising:
a channel formed through the platform topside;
a coverplate, which comprises a non-integral component to the platform, that is affixed to the platform topside;
wherein:
the channel comprises an inlet, through which, in operation, coolant enters the platform cooling passage, and an outlet through which, in operation, coolant exits the platform cooling passage;
wherein the channel comprises fluid directing structure, the fluid directing structure comprising an integral component to the platform; and
wherein the coverplate is configured to correspond to the shape of the channel such that, when affixed in a desired manner, the coverplate substantially encloses the channel to form the platform cooling passage.

20. The platform cooling passage according to claim 19, wherein:
once the coverplate is affixed to the platform topside in the desired manner, an outer radial surface of the platform within the platform cooling passage area comprises a floor of the platform cooling passage, and the inner radial surface of the coverplate comprises a ceiling of the platform cooling passage;
the fluid directing structure comprises wall-partitions that extend substantially from the floor to the ceiling of the platform cooling passage; and
the wall-partitions are configured to define a winding path through the platform cooling passage, the winding path configured to fluidly connecting the inlet to the outlet.

21. The platform cooling passage according to claim 20, wherein:
the rotor blade includes an interior cooling passage formed therein that extends from a connection with a coolant source at the root to at least the approximate radial height of the platform, wherein, in operation, the interior cooling passage comprises at least a high-pressure coolant region and a low-pressure coolant region;
the inlet comprises a high-pressure connector, the high-pressure connector comprising a connection between an upstream end of the platform cooling passage and the high-pressure coolant region of the interior cooling passage;
the outlet comprises a low-pressure connector, the low-pressure connector comprising a connection between a downstream end of the platform cooling passage and the low-pressure coolant region of the interior cooling passage; and
the coverplate comprises a seal at the interface the coverplate makes with the topside of the platform such that, in operation, coolant exits the platform cooling passage substantially through the outlet only.

22. The platform cooling passage according to claim 19, wherein the recessed area comprises a serpentine shaped channel that extends along the platform topside such that once the coverplate substantially encloses the recessed area, a serpentine platform cooling passage is formed.

23. The platform cooling passage according to claim 19, wherein the coverplate and the recessed area are formed such that, once affixed, an outer radial surface of the coverplate resides approximately flush in relation to the platform topside that surrounds the coverplate.

24. The platform cooling passage according to claim 19, wherein the recessed area comprises a step, wherein the step is positioned along an outer rim of the recessed area and configured to support the coverplate at a desired radial height within the recessed area;
wherein the desired radial position comprises one in which a predetermined clearance between the floor and the ceiling of the platform cooling passage is achieved; and
wherein the desired radial position comprises one in which an outer radial surface of the coverplate resides approximately flush in relation to the platform topside that surrounds the coverplate.

* * * * *